US011230135B2

(12) United States Patent
Sambhy et al.

(10) Patent No.: US 11,230,135 B2
(45) Date of Patent: Jan. 25, 2022

(54) MULTI-LAYER IMAGING BLANKET (71) Applicant: XEROX CORPORATION, Norwalk, CT (US)

(72) Inventors: Varun Sambhy, Pittsford, NY (US); Lin Ma, Pittsford, NY (US); Kyle B. Tallman, Farmington, NY (US); Santokh S. Badesha, Pittsford, NY (US); Michael S. Roetker, Webster, NY (US); Mark C. Petropoulos, Webster, NY (US); Jack T. LeStrange, Macedon, NY (US); Joseph C. Sheflin, Macedon, NY (US); Peter J. Knausdorf, Henrietta, NY (US); Jorge A. Alvarez, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 106 days.

(21) Appl. No.: 16/405,565

(22) Filed: May 7, 2019

(65) Prior Publication Data

US 2020/0353770 A1   Nov. 12, 2020

(51) Int. Cl.
*B41N 10/04* (2006.01)
*B41F 7/02* (2006.01)
(Continued)

(52) U.S. Cl.
CPC .......... *B41N 10/04* (2013.01); *B32B 5/24* (2013.01); *B32B 25/10* (2013.01); *B41C 1/10* (2013.01);
(Continued)

(58) Field of Classification Search
None
See application file for complete search history.

(56) References Cited

U.S. PATENT DOCUMENTS 4,174,244 A   11/1979   Thomas et al.
6,289,809 B1   9/2001   Sonobe
(Continued)

FOREIGN PATENT DOCUMENTS

EP   1428673 A1   6/2004
EP   3248804 A1   11/2017
EP   3285121 A2   2/2018

OTHER PUBLICATIONS

Extended European Search Report dated Oct. 2, 2020 in corresponding European Application No. 20173072.8, 9 pages.
(Continued)

*Primary Examiner* — Joshua D Zimmerman
(74) *Attorney, Agent, or Firm* — MH2 Technology Law Group LLP (57) ABSTRACT The present disclosure is directed to a multilayer imaging blanket for a variable data lithography printing system, including: a multilayer base having a lower contacting surface configured to wrap around or to be mounted on a cylinder core of the variable data lithography printing system; and a platinum catalyzed fluorosilicone surface layer opposite the lower contacting surface; wherein the multilayer base is a sulfur-free carcass including: a top layer including a sulfur-free rubber substrate such as an ethylene propylene diene monomer (EPDM) rubber substrate, a bottom layer including the lower contacting surface; and a compressible layer disposed between the top layer and the bottom layer, the compressible layer being attached to a surface of the top layer opposite the platinum catalyzed fluorosilicone surface layer and a surface of the bottom layer opposite the lower contacting surface, optionally the top layer further comprises a reinforcing fabric layer, the reinforcing fabric layer attached to a surface of the compressible layer opposite the bottom layer.

20 Claims, 5 Drawing Sheets (51) Int. Cl.

| | |
|---|---|
| *B32B 5/24* | (2006.01) |
| *B32B 25/10* | (2006.01) |
| *B41C 1/10* | (2006.01) |
| *B41F 3/30* | (2006.01) |
| *B41J 2/005* | (2006.01) |
| *B41M 1/06* | (2006.01) |
| *B41N 3/08* | (2006.01) |

(52) U.S. Cl.
CPC ............... *B41F 3/30* (2013.01); *B41F 7/02* (2013.01); *B41J 2/0057* (2013.01); *B41M 1/06* (2013.01); *B41N 3/08* (2013.01)

(56) References Cited

U.S. PATENT DOCUMENTS

| | | | |
|---|---|---|---|
| 6,688,226 B2 | 2/2004 | Rossini et al. | |
| 9,950,549 B2 | 4/2018 | Kanungo et al. | |
| 2003/0233953 A1 | 12/2003 | Pan et al. | |
| 2012/0103212 A1 | 5/2012 | Stowe et al. | |
| 2012/0103216 A1* | 5/2012 | Knisel .................. | B41N 10/04 101/401.1 |
| 2013/0081549 A1 | 4/2013 | Stowe | |
| 2015/0070454 A1 | 3/2015 | Moorlag et al. | |
| 2015/0291847 A1 | 10/2015 | Condello et al. | |
| 2016/0176185 A1 | 6/2016 | Kanungo et al. | |
| 2016/0236500 A1 | 8/2016 | Fu et al. | |
| 2017/0015115 A1 | 1/2017 | Chen et al. | |
| 2017/0341452 A1* | 11/2017 | Kanungo .................. | B41C 1/10 |
| 2018/0050532 A1 | 2/2018 | Stowe et al. | |
| 2019/0322114 A1 | 10/2019 | Sambhy et al. | |
| 2020/0282759 A1 | 9/2020 | Sambhy et al. | |
| 2020/0307293 A1 | 10/2020 | Sambhy et al. | |
| 2021/0016590 A1 | 1/2021 | Sambhy et al. | |

OTHER PUBLICATIONS

Author Unknown, "Silicone Rubber Material Specifications," downloaded Jun. 17, 2019 from https://www.exonicpolymers.com/articles.asp?ID=266, 5 pages.
Extended European Search Report dated Sep. 1, 2020 in related European Application No. 20164739.3.
Extended European Search Report dated Dec. 21, 2020 in related European Application No. 20182118.8.
Lewis et al. "Platinum Catalysts Used in the Silicones Industry," Platinum Metals Rev., 1997, 41 (2), 66-75.
Wikipedia, "Silicone rubber," downloaded Jun. 17, 2019 from https://en.wikipedia.org/wiki/silicone_rubber, 11 pages.
Extended European Search Report dated May 25, 2021 in related European Application No. 20182118.8, 15 pages.

* cited by examiner

MULTI-LAYER IMAGING BLANKET

FIELD OF USE

The disclosure relates to marking and printing systems, and more specifically to an imaging blanket of such a system.

BACKGROUND

Offset lithography is a common method of printing today. In a typical lithographic process, an image transfer member or imaging plate, which may be a flat plate-like structure, the surface of a cylinder, or belt, etc., is configured to have "image regions" formed of hydrophobic and oleophilic material, and "non-image regions" formed of a hydrophilic material. The image regions are regions corresponding to the areas on the final print (i.e., the target substrate) that are occupied by a printing or marking material such as ink, whereas the non-image regions are the regions corresponding to the areas on the final print that are not occupied by said marking material. The hydrophilic regions accept and are readily wetted by a water-based fluid, commonly referred to as a fountain solution or dampening fluid (typically consisting of water and a small amount of alcohol as well as other additives and/or surfactants to, for example, reduce surface tension). The hydrophobic regions repel fountain solution and accept ink, whereas the fountain solution formed over the hydrophilic regions forms a fluid "release layer" for rejecting ink.

The hydrophilic regions of the imaging plate correspond to unprinted areas, or "non-image areas", of the final print. The ink may be transferred directly to a substrate, such as paper, or may be applied to an intermediate surface, such as an offset (or blanket) cylinder in an offset printing system. In the latter case, the offset cylinder is covered with a conformable coating or sleeve with a surface that can conform to the texture of the substrate, which may have surface peak-to-valley depth somewhat greater than the surface peak-to-valley depth of the blanket. Sufficient pressure is used to transfer the image from the blanket or offset cylinder to the substrate.

The above-described lithographic and offset printing techniques utilize plates which are permanently patterned with the image to be printed (or its negative), and are therefore useful only when printing a large number of copies of the same image (long print runs), such as magazines, newspapers, and the like. These methods do not permit printing a different pattern from one page to the next (referred to herein as variable printing) without removing and replacing the print cylinder and/or the imaging plate (i.e., the technique cannot accommodate true high speed variable printing wherein the image changes from impression to impression, for example, as in the case of digital printing systems).

Efforts have been made to create lithographic and offset printing systems for variable data. One example is disclosed in U. S. Patent Application Publication No. 2012/0103212 A1 (the '212 Publication) published May 3, 2012, in which an intense energy source such as a laser is used to patternwise evaporate a fountain solution. The '212 publication discloses a family of variable data lithography devices that use a structure to perform both the functions of a traditional imaging plate and of a traditional imaging blanket to retain a patterned fountain solution of dampening fluid for inking, and to delivering that ink pattern to a substrate.

Typically, such imaging blankets use a seamless engineered rubber substrate (known as a 'carcass') on which e.g., polymers that form the reimaginable surface, are coated and then cured. Accordingly, the rubber of the carcass should be resistant to coating solvents and be able to withstand curing conditions for an extended period of time.

Particularly desirable polymers for use with imaging blankets are fluoropolymers. Fluoropolymers have release properties that are particularly beneficial for use with certain toners and printing ink materials. However, fluoropolymer curing can be impeded with art-known carcasses. Hence, there is a need in the art for carcasses that are compatible with fluoropolymer curing and which are temperature and solvent stable.

SUMMARY

Rubber substrates used in carcasses of imaging blankets on which fluoropolymers, such as fluorosilicone, are coated and cured are based on nitrile butadiene rubber (NBR). Typically, a dispersion of fluorosilicone and carbon black are applied as wet film on such carcasses and then cured at high temperature to yield a final imaging blanket. The inventors recognized, however, that a sulfur crosslinker is used to manufacture NBR, which is incompatible with fluorosilicone curing. As described herein, a platinum catalyst is used during fluorosilicone curing and small (parts per billions) levels of sulfur can poison these catalysts. See "Platinum Catalysts Used in the Silicones Industry", Lewis et. al., *Platinum Metals Rev.*, 1997,41, (2), 66-75. In view of the foregoing, the present inventors designed carcasses based on sulfur-free rubber, e.g., ethylene propylene diene monomer rubber (EPDM). Such novel carcasses, surprisingly, are not only compatible with flurosilicone curing chemistry, for example, but are resistant to coating solvents and able to withstand harsh curing conditions, such as 160° C. temperatures for extended time periods. Accordingly, the present blanket configuration including sulfur-free carcasses may be used with desirable surface layers that include fluoropolymers, such as fluorosilicone.

In one aspect, the present disclosure is directed to a multilayer imaging blanket for a variable data lithography printing system, comprising: a multilayer base having a lower contacting surface configured to wrap around or to be mounted on a cylinder core of the variable data lithography printing system; and a platinum catalyzed fluorosilicone surface layer opposite the lower contacting surface; wherein the multilayer base is a sulfur-free carcass comprising: a top layer comprising an ethylene propylene diene monomer (EPDM) rubber substrate, a bottom layer comprising the lower contacting surface; and a compressible layer disposed between the top layer and the bottom layer, the compressible layer being attached to a surface of the top layer opposite the platinum catalyzed fluorosilicone surface layer and a surface of the bottom layer opposite the lower contacting surface.

In another aspect, the present disclosure is directed to a variable data lithography system, comprising: a multilayer imaging blanket comprising: a multilayer base having a lower contacting surface configured to wrap around or to be mounted on a cylinder core of the variable data lithography printing system; and a platinum catalyzed fluorosilicone surface layer opposite the lower contacting surface; wherein the multilayer base is a sulfur-free carcass comprising: a top layer comprising an ethylene propylene diene monomer (EPDM) rubber substrate, a bottom layer comprising the lower contacting surface; and a compressible layer disposed between the top layer and the bottom layer, the compressible layer being attached to a surface of the top layer opposite the platinum catalyzed fluorosilicone surface layer and a surface of the bottom layer opposite the lower contacting surface; a fountain solution subsystem configured for applying a layer of fountain solution to the multilayer imaging blanket; a patterning subsystem configured for selectively removing portions of the fountain solution layer so as to produce a latent image in the fountain solution; an inking subsystem configured for applying ink over the imaging blanket such that said ink selectively occupies regions of the imaging blanket where fountain solution was removed by the patterning subsystem to thereby produce an inked latent image; and an image transfer subsystem configured for transferring the inked latent image to a substrate; and an image transfer subsystem configured for transferring the inked latent image to a substrate.

In yet another aspect, the present disclosure is directed to a multilayer imaging blanket for a variable data lithography printing system, comprising: a multilayer base having a lower contacting surface configured to wrap around or to be mounted on a cylinder core of the variable data lithography printing system; and a platinum catalyzed fluorosilicone surface layer opposite the lower contacting surface; wherein the multilayer base is a sulfur-free carcass comprising: a top layer comprising a sulfur-free rubber substrate; a bottom layer comprising the lower contacting surface; and a compressible layer attached to a surface of the top layer opposite the platinum catalyzed fluorosilicone surface layer and a surface of the bottom layer opposite the lower contacting surface; and wherein the fluorosilicone surface layer adheres to the surface of the sulfur-free rubber substrate of the top layer in the absence of a primer layer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

All physical properties that are defined hereinafter are measured at 20° C. to 25° C. unless otherwise specified. The term "room temperature" refers to 25° C. unless otherwise specified.

The term "fluorosilicone" as used herein refers to polyorganosiloxanes having a backbone formed from silicon and oxygen atoms, and sidechains containing carbon, hydrogen, and fluorine atoms. At least one fluorine atom is present in the sidechain. The sidechains can be linear, branched, cyclic, or aromatic. The fluorosilicone may also contain functional groups, such as amino groups, which permit addition cross-linking. When the cross-linking is complete, such groups become part of the backbone of the overall fluorosilicone. The side chains of the polyorganosiloxane can also be alkyl or aryl. Fluorosilicones are commercially available, for example CF1-3510 from NuSil or SLM (n-27) from Wacker.

The terms "print media", "print substrate" and "print sheet" generally refer to a usually flexible physical sheet of paper, polymer, Mylar material, plastic, or other suitable physical print media substrate, sheets, webs, etc., for images, whether precut or web fed.

The term "printing device" or "printing system" as used herein refers to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printing system" may handle sheets, webs, substrates, and the like. A "printing system" can place marks on any surface, and the like, and is any machine that reads marks on input sheets; or any combination of such machines.

As used herein, the term "ink-based digital printing" is used interchangeably with "variable data lithography printing" and "digital offset printing," and refers to lithographic printing of variable image data for producing images on a substrate that are changeable with each subsequent rendering of an image on the substrate in an image forming process.

As used herein, "ink-based digital printing" includes offset printing of ink images using lithographic ink where the images are based on digital image data that may vary from image to image. As used herein, the ink-based digital printing may use a digital architecture for lithographic ink (DALI) or a variable data lithography printing system or a digital offset printing system, where the system is configured for lithographic printing using lithographic inks and based on digital image data, which may vary from one image to the next.

As used herein, "an ink-based digital printing system using DALI" may be referred to as a DALI printer.

As used herein, "an imaging member of a DALI printer" may be referred to interchangeably as a DALI printing plate and a DALI imaging blanket.

Many of the examples mentioned herein are directed to an imaging blanket (including, for example, a printing sleeve, belt, drum, and the like) that has a uniformly grained and textured blanket surface that is ink-patterned for printing. In a still further example of variable data lithographic printing, such as disclosed in the '212 Publication, a direct central impression printing drum having a low durometer polymer imaging blanket is employed, over which for example, a latent image may be formed and inked. Such a polymer imaging blanket requires, among other parameters, a unique specification of surface roughness, radiation absorptivity, and oleophobicity.

Figure 1:
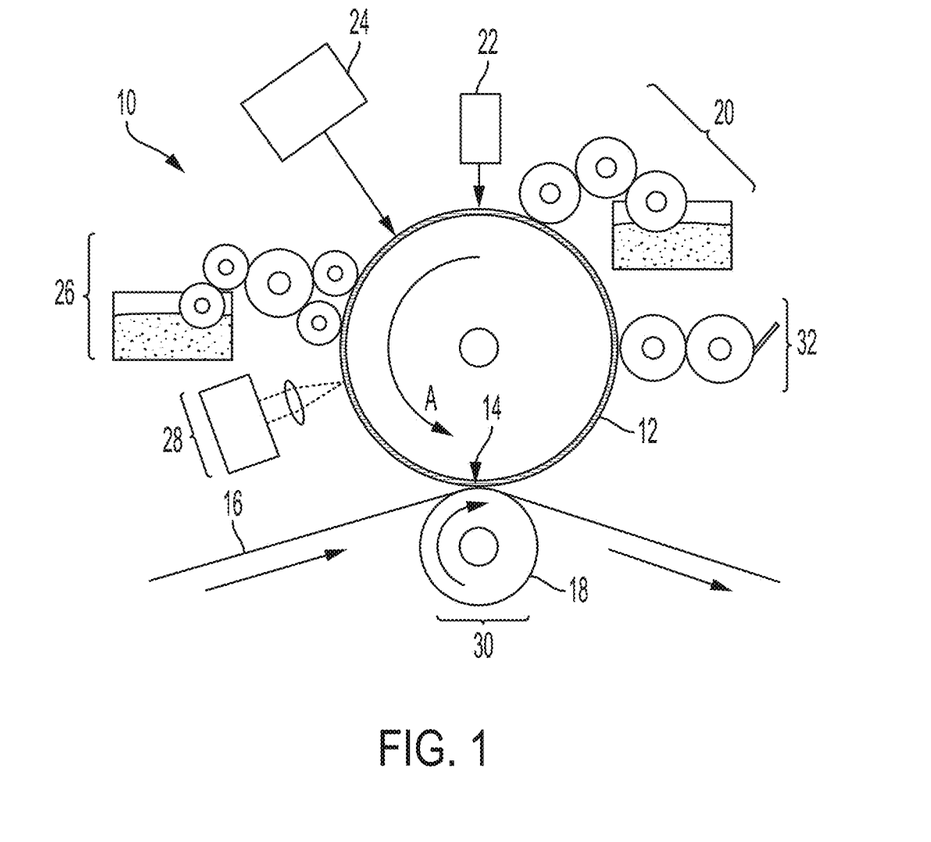
FIG. 1 depicts a side view of a variable data lithography system according to various embodiments disclosed herein.

FIG. 1 depicts an exemplary variable data lithography printing system 10. Additional details regarding individual components and/or subsystems shown in the exemplary system 10 of FIG. 1 may be found in the '212 publication, which is herein incorporated by reference in its entirety. As shown in FIG. 1, the exemplary system 10 may include an imaging member 12 used to apply an inked image to a target image receiving media substrate 16 at a transfer nip 14. The transfer nip 14 is produced by an impression roller 18, as part of an image transfer mechanism 30, exerting pressure in the direction of the imaging member 12.

The imaging member 12 may include a reimageable surface layer (imaging blanket layer or carcass) formed over a structural mounting layer that may be, for example, a cylindrical core, or one or more structural layers over a cylindrical core. A fountain solution subsystem 20 may be provided generally comprising a series of rollers, which may be considered as dampening rollers or a dampening unit, for uniformly wetting the reimageable surface with a layer of dampening fluid or fountain solution, generally having a uniform thickness, to the reimageable surface of the imaging member 12. Once the dampening fluid or fountain solution is metered onto the reimageable surface, a thickness of the layer of dampening fluid or fountain solution may be measured using a sensor 22 that provides feedback to control the metering of the dampening fluid or fountain solution onto the reimageable surface.

The exemplary system 10 may be used for producing images on a wide variety of image receiving media substrates 16. The '212 Publication explains the wide latitude of marking (printing) materials that may be used, including marking materials with pigment densities greater than 10% by weight. Increasing densities of the pigment materials suspended in solution to produce different color inks is generally understood to result in increased image quality and vibrancy. These increased densities, however, often result in precluding the use of such inks in certain image forming applications that are conventionally used to facilitate variable data digital image forming, including, for example, jetted ink image forming applications.

As noted above, the imaging member 12 may include a reimageable surface layer or plate formed over a structural mounting layer that may be, for example, a cylindrical core, or one or more structural layers over a cylindrical core. A fountain solution subsystem 20 may be provided generally comprising a series of rollers, which may be considered as dampening rollers or a dampening unit, for uniformly wetting the reimageable plate surface with a layer of dampening fluid or fountain solution, generally having a uniform thickness, to the reimageable plate surface of the imaging member 12. Once the dampening fluid or fountain solution is metered onto the reimageable surface, a thickness of the layer of dampening fluid or fountain solution may be measured using a sensor 22 that provides feedback to control the metering of the dampening fluid or fountain solution onto the reimageable plate surface.

An optical patterning subsystem 24 may be used to selectively form a latent image in the uniform fountain solution layer by image-wise patterning the fountain solution layer using, for example, laser energy. It is advantageous to form the reimageable plate surface of the imaging member 12 from materials that should ideally absorb most of the IR or laser energy emitted from the optical patterning subsystem 24 close to the reimageable plate surface. Forming the plate surface of such materials may advantageously aid in substantially minimizing energy wasted in heating the fountain solution and coincidentally minimizing lateral spreading of heat in order to maintain a high spatial resolution capability. Briefly, the application of optical patterning energy from the optical patterning subsystem 24 results in selective evaporation of portions of the uniform layer of fountain solution in a manner that produces a latent image.

The patterned layer of fountain solution having a latent image over the reimageable plate surface of the imaging member 12 is then presented or introduced to an inker subsystem 26. The inker subsystem 26 is usable to apply a uniform layer of ink over the patterned layer of fountain solution and the reimageable plate surface of the imaging member 12. In embodiments, the inker subsystem 26 may use an anilox roller to meter an ink onto one or more ink forming rollers that are in contact with the reimageable plate surface of the imaging member 12. In other embodiments, the inker subsystem 26 may include other traditional elements such as a series of metering rollers to provide a precise feed rate of ink to the reimageable plate surface. The inker subsystem 26 may deposit the ink to the areas representing the imaged portions of the reimageable plate surface, while ink deposited on the non-imaged portions of the fountain solution layer will not adhere to those portions.

Cohesiveness and viscosity of the ink residing on the reimageable plate surface may be modified by a number of mechanisms, including through the use of some manner of rheology control subsystem 28. In embodiments, the rheology control subsystem 28 may form a partial cross-linking core of the ink on the reimageable plate surface to, for example, increase ink cohesive strength relative to an adhesive strength of the ink to the reimageable plate surface. In embodiments, certain curing mechanisms may be employed. These curing mechanisms may include, for example, optical or photo curing, heat curing, drying, or various forms of chemical curing. Cooling may be used to modify rheology of the transferred ink as well via multiple physical, mechanical or chemical cooling mechanisms.

Substrate marking occurs as the ink is transferred from the reimageable plate surface to a substrate of image receiving media 16 using the transfer subsystem 30. With the adhesion and/or cohesion of the ink having been modified by the rheology control system 28, modified adhesion and/or cohesion of the ink causes the ink to transfer substantially completely preferentially adhering to the substrate 16 as it separates from the reimageable plate surface of the imaging member 12 at the transfer nip 14. Careful control of the temperature and pressure conditions at the transfer nip 14, combined with reality adjustment of the ink, may allow transfer efficiencies for the ink from the reimageable plate surface of the imaging member 12 to the substrate 16 to exceed 95%. While it is possible that some fountain solution may also wet substrate 16, the volume of such transferred fountain solution will generally be minimal so as to rapidly evaporate or otherwise be absorbed by the substrate 16.

Finally, a cleaning system 32 is provided to remove residual products, including non-transferred residual ink and/or remaining fountain solution from the reimageable plate surface in a manner that is intended to prepare and condition the reimageable plate surface of the imaging member 12 to repeat the above cycle for image transfer in a variable digital data image forming operations in the exemplary system 10. An air knife may be employed to remove residual fountain solution. It is anticipated, however, that some amount of ink residue may remain. Removal of such remaining ink residue may be accomplished through use by some form of cleaning subsystem 32. The cleaning subsystem 32 may include at least a first cleaning member such as a sticky or tacky member in physical contact with the reimageable surface of the imaging member 12, where the sticky or tacky member removes residual ink and any remaining small amounts of surfactant compounds from the fountain solution of the reimageable surface of the imaging member 12. The sticky or tacky member may then be brought into contact with a smooth roller to which residual ink may be transferred from the sticky or tacky member, the ink being subsequently stripped from the smooth roller by, for example, a doctor blade.

Regardless of the cleaning mechanism, however, cleaning of the residual ink and fountain solution from the reimageable surface of the imaging member 12 is essential to prevent a residual image from being printed in the proposed system. Once cleaned, the reimageable surface of the imaging member 12 is again presented to the fountain solution subsystem 20 by which a fresh layer of fountain solution is supplied to the reimageable surface of the imaging member 12, and the process is repeated.

The imaging member 12 plays multiple roles in the variable data lithography printing process, which include: (a) deposition of the fountain solution, (b) creation of the latent image, (c) printing of the ink, and (d) transfer of the ink to the receiving substrate or media. Some desirable qualities for the imaging member 12, particularly its surface, include high tensile strength to increase the useful service lifetime of the imaging member. In some embodiments, the surface layer should also weakly adhere to the ink, yet be wettable with the ink, to promote both uniform inking of image areas and to promote subsequent transfer of the ink from the surface to the receiving substrate. Finally, some solvents have such a low molecular weight that they inevitably cause some swelling of imaging member surface layers. Wear can proceed indirectly under these swell conditions by causing the release of near infrared laser energy absorbing particles at the imaging member surface, which then act as abrasive particles. Accordingly, in some embodiments, the imaging member surface layer has a low tendency to be penetrated by solvent.

Figure 2:
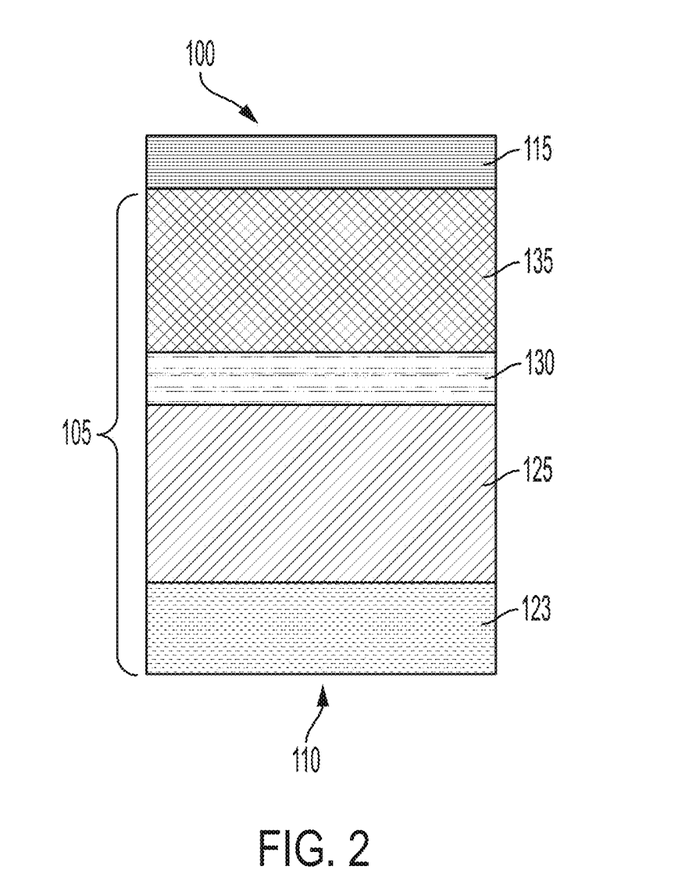
FIG. 2 depicts a side diagrammatical view of a multilayer imaging blanket according to various embodiments disclosed herein.

FIG. 2 depicts an imaging blanket 100 for a variable data lithography printing system. The imaging blanket 100 is a multilayer blanket having a base 105 and a platinum catalyzed fluorosilicone surface with carbon black (CB is IR absorber) layer 115. The multilayer blanket 100 has a lower contacting surface 110, which is configured to contact directly or indirectly to e.g., a support, such as a cylinder core, to define an imaging blanket cylinder.

The multilayer base 105 is a carcass designed to support the surface (e.g., topcoat) layer 115. The carcass is typically sulfur-free. In some embodiments, the multilayer base 105 is stable at high temperatures such as from 140° C. to 180° C., such as 160° C., for an extended period of time, such as from between 2 and 6 hours, such as between 3 to 5 hours, such as about 4 hours. The multilayer base 105 may include a bottom layer 123 with a lower contacting surface 110, a compressible layer 125 and a top layer 135 comprising a sulfur-free rubber substrate. In some embodiments, a reinforcing fiber layer 130 is adheredly disposed between the sulfur-free rubber layer 135 and the compressible rubber layer 125. "Sulfur-free" as used herein is understood to include less than 0.3% sulfur, such as 0.0% sulfur.

In some embodiments, the bottom layer 123 is a bottom fabric layer. The bottom fabric layer may be a woven fabric (e.g., cotton, cotton and polyester, polyester) with a lower contacting surface configured to contact directly or indirectly to a mandrel or other support such as a cylinder core to define a blanket cylinder. The bottom fabric layer may have a substance value in a range between 150-250 gr/m$^2$.

In some embodiments, the bottom layer 123 is a base sleeve. The base sleeve typically comprises an inner tubular cylindrical portion (not shown). The cylindrical portion (not shown) may have a through longitudinal bore enabling the sleeve to be mounted on, e.g., a rotary support, such as a cylinder core, and to present an inner surface arranged to cooperate with the outer surface of the rotary support.

The base sleeve, when intended for mounting on e.g., a rotary mandrel of fixed diameter, may be constructed of material sufficiently elastic to enable the portion itself to elastically expand radially by a minimum amount to enable it to be mounted on the rotary support. In this case, the base sleeve may be constructed of e.g., a thin nickel shell or can have a composite structure of resins and fiber glass with a radial thickness ranging from about, for example, 100 to 1000 micrometers (μm), such as 500 μm. Examples of compositions that are suitable for comprising the base sleeve include e.g., aramid fiber bonded with epoxy resin or polyester resin and reinforced polymeric material, such as hardened glass fiber bonded with epoxy resin or polyester resin, the latter two also known as fiberglass reinforced epoxy resin or fiberglass reinforced polyester. Typically, however, the base sleeve is composed of nickel.

The base sleeve may, in some embodiments, be constructed of material sufficiently rigid, such that the inner tubular cylindrical portion (not shown) can retain a fixed diameter under pressure from an expanding rotary support. In some embodiments, the base sleeve is desirably constructed of a composite structure of graphite impregnated plastics or of resins and fibers, such as carbon fibers. In the latter, the carbon fiber may be desirably oriented parallel to the rotational axis K in order to provide the sleeve with maximum rigidity. The sleeve can also be constructed of a rigid metal, e.g., steel or a rigid polyurethane, e.g., with a hardness exceeding 70° Shore D. In some embodiments, the bottom layer 123 is a base sleeve with a radial thickness ranging from about, for example, 100 to 1000 micrometers (μm).

In some embodiments, the bottom layer 123 is a base sleeve further comprising a fabric layer. The fabric layer may be attached to the base sleeve opposite the lower contacting surface of the base sleeve with an adhesive, e.g., a non-sulfur base adhesive such as an EPDM bonding adhesive.

The compressible layer 125 may be an elastomer having the properties needed to perform applications typically associated with offset printing. The elastomer typically ranges in thickness from 100-1000 μm. The compressible layer 125 may be formed using techniques known in the art. For example, an elastomeric compound including known processing, stabilizing, strengthening and curing additives may be used to form the compressible layer 125. Any suitable polymeric material that is considered a curable or vulcanizable material can be used, provided that it is sulfur-free. An elastomer that is resistant to solvents and ink is desired. In some embodiments, the compressible layer 125 may include microspheres impregnated into an elastomer as disclosed in U.S. Pat. No. 4,770,928, which is herein incorporated by reference in its entirety. In some embodiments, the compressible rubber layer 125 may be made of a polymeric foam, typically with EPDM rubber modified by adding an expansion agent. In other embodiments, a polyurethane foam is used.

The compressible layer 125 may be secured to the bottom layer 123 opposite the lower contacting layer 110 using techniques known in the art. For example, in construction, a compressible layer may be formed directly onto bottom layer 123 using pour or injection molding techniques. The compressible layer 125 may alternatively be applied using extrude spray spun processes or other techniques as is known in the art. Further, one skilled in the art will recognize that the compressible layer 125 may be substantially vulcanized prior to assembly, or may be secured to the bottom layer 123 by means of a suitable adhesive. The top layer comprising the sulfur free rubber substrate 135 is typically a seamless sulfur free rubber substrate. In some embodiments, the sulfur-free rubber substrate is EPDM. Typically, the thickness of the EPDM ranges from 100 to 500 micrometers. EPDM is commercially available from Exxon Mobile Inc., Houston Tex., for example. Other suitable vendors include The Dow Chemical Company, Midland Mich., Lion Elastomers LLC, Port Neches, Tex., LANXESS Chemical Company, Cologne, Germany and MITSUI CHEMICALS Company, Tokyo, Japan.

In some embodiments, the top layer 135 further comprises an optional fiber reinforcing layer 130, typically comprising a layer of non-stretchable material. For example, the reinforcing layer 130 may be a layer of woven or nonwoven fabric, a reinforcing film such as MYLAR® (polyester), a reinforced film such as carbon fiber or aramid fiber, cord, fiberglass or a surface layer of hard polyurethane. Where the reinforcing layer 130 is formed from a fabric layer, the material may include plain woven fabric from high grade cotton yarns, which are free from slubs and knots, weaving defects, seeds, etc. The fabric may also be rayon, nylon, polyester, or mixtures thereof. The reinforcing layer 130 may be secured to a sulfur free rubber substrate to form the top layer 135 using any art known method including adhesion with a suitable sulfur-free adhesive such as an EPDM bonding adhesive. The reinforcing fiber layer 130 of the top layer 135 may be secured to the compressible layer 125 opposite the bottom layer 123 using any art known method including suitable sulfur free adhesives as described herein.

In some embodiments, prior to the application of a platinum catalyzed fluorosilicone surface layer 115 on the top layer comprising the sulfur-free rubber substrate 135 of the multilayer base 105, a primer layer (not shown) is applied to the top layer 135 to allow for interlayer adhesion between the multilayer base 105 and the surface layer 115. An example of the primer in the primer layer is a siloxane based primer with the main component being octamethyl trisiloxane (e.g., S11 NC commercially available from Henkel). In addition an inline corona treatment can be applied to the multilayer base 105 and/or primer layer to allow for and/or further improve adhesion, as readily understood by a skilled artisan. Such inline corona treatments may increase the surface energy and adhesion of the imaging blanket layers.

In some embodiments, no primer layer and/or corona treatment are needed since the fluorosilicone surface layer adheres to the top surface comprising the sulfur-free rubber substrate in the absence of a primer layer and/or in the absence of corona treatment.

In some embodiments, the surface layer 115 is manufactured from a first part and a second part. The first part (Part A) may include fluorosilicone, an IR absorbing filler, silica and a solvent. The second part (Part B) may include a platinum catalyst having vinyl groups, a cross-linker having hydrosilane groups, a solvent and an inhibitor. The ratio molar ratio of vinyl groups to hydrosilane groups in Part B is 1:1.

The fluorosilicone of part A may include a vinyl terminated trifluoropropyl methylsiloxane polymer (e.g., Wacker 50330, SML (n=27)), which is illustrated below in Formula 1, where n can be in a range from 10 to 100, or from 15 to 90 or from 18 to 80.

Formula 1

In embodiments, the IR absorbing filler of Part A may be carbon black, a metal oxide such as iron oxide (FeO), carbon nanotubes, graphene, graphite, or carbon fibers. The IR absorbing filler may have an average particle size of from about 2 nanometers (nm) to about 10 μm. In an embodiment, the IR absorbing filler may have an average particle size of from about 20 nm to about 5 μm. In another embodiment, the filler has an average particle size of about 100 nm. In embodiments, the IR absorbing filler is carbon black. In an embodiment, the IR absorbing filler is a low-sulfur carbon black, such as Emperor 1600 (available from Cabot). In an embodiment, a sulfur content of the carbon black is 0.3% or less. In an embodiment, the sulfur content of the carbon black is 0.15% or less.

In embodiments, the Part A includes silica. For example, in one embodiment, the Part A includes between 1 weight percent and 5 weight percent silica based on the total weight of the surface layer composition. In another embodiment, the surface layer includes between 1 weight percent and 4 weight percent silica. In yet another embodiment, the surface layer includes about 1.15 weight percent silica based on the total weight of the surface layer composition. The silica may have an average particle size of from about 10 nanometers to about 0.2 μm. In one embodiment, the silica may have an average particle size of from about 50 nanometers to about 0.1 μm. In another embodiment, the silica has an average particle size of about 20 nanometers.

In embodiments, the solvent of Part A may be butyl acetate, trifluorotoluene toluene, benzene, methylethylketone, methyl isobutyl ketone, ethyl acetate, propyl acetate, amyl acetate, hexyl acetate and mixtures thereof.

Part B may include a platinum catalyst having vinyl groups. The platinum (Pt) catalyst is illustrated in Formula 2 below.

Formula 2

Part B may include a cross-linker (e.g., trifluoropropyl methylsiloxane polymer having hydrosilane groups). In some embodiments, the surface layer composition includes fluorosilicone cross-linker. In some embodiments, the cross-linker is a XL-150 cross-linker from NuSil Corporation. In some embodiments, the cross-linker is a SLM 50336 cross-linker from Wacker. For example, in some embodiments, the surface layer composition includes between 10 weight percent and 28 weight percent of a cross-linker based on the total weight of the surface layer composition. In another embodiment, the surface layer includes between 12 weight percent and 30 weight percent cross-linker. In yet another embodiment, the surface layer includes about 15 weight percent cross-linker based on the total weight of the surface layer composition.

A cross-linker having hydrosilane groups is illustrated in Formula 3 below.

Formula 3

In Formula 3 n is from 10 to 100, or n is from 15 to 90, or n is from 18 to 80; and m is from 1 to 50, or m is from 2 to 45 or m is from 3 to 40. The molar ratio of vinyl groups in Part A to hydrosilane groups in the cross-linker in Part B is 0.7:1.0 to about 1.3:1.0, or a molar ratio of from 0.8:1.0 to about 1.2:1.0, or the molar ratio is from about 0.9:1.0 to about 1.1:1.0.

The inhibitor (pt88) may be used in the solution to increase the pot life of the combined solution of Part A and Part B for flow coating.

In embodiments, the solvent of Part B may be butyl acetate, trifluorotoluene, toluene, benzene, methylethylketone, methyl isobutyl ketone, ethyl acetate, propyl acetate, amyl acetate, hexyl acetate and mixtures thereof.

The surface layer 115 (FIG. 2) may be coated on the top layer of the multilayer base 105 comprising sulfur-free rubber. Some embodiments contemplate methods of manufacturing the imaging member surface layer 115 (FIG. 2). For example, in one embodiment, the method includes depositing a fluorosilicone surface layer composition upon a multilayer base comprising a sulfur free rubber substrate, such as EPDM, by flow coating, ribbon coating or dip coating; and curing the surface layer at an elevated temperature.

In embodiments, the platinum catalyst is added to Part A followed by gentle shaking. Then Part B is added to the Part A solution containing Pt catalyst followed by 5 minutes of ball milling. The total solid content is controlled by dilution with additional amount of butyl acetate. The dispersion is filtered to remove the stainless steel beads, followed by degassing of the filtered dispersion. The dispersion is then coated over the multilayer base and optionally, a primer layer.

The curing may be performed at an elevated temperature of from about 140° C. to about 180° C. This elevated temperature is in contrast to room temperature. The curing may occur for a time period of from about 2 to 6 hours. In some embodiments, the curing time period is between 3 to 5 hours. In one embodiment, the curing time period is about 4 hours.

Figure 3A:
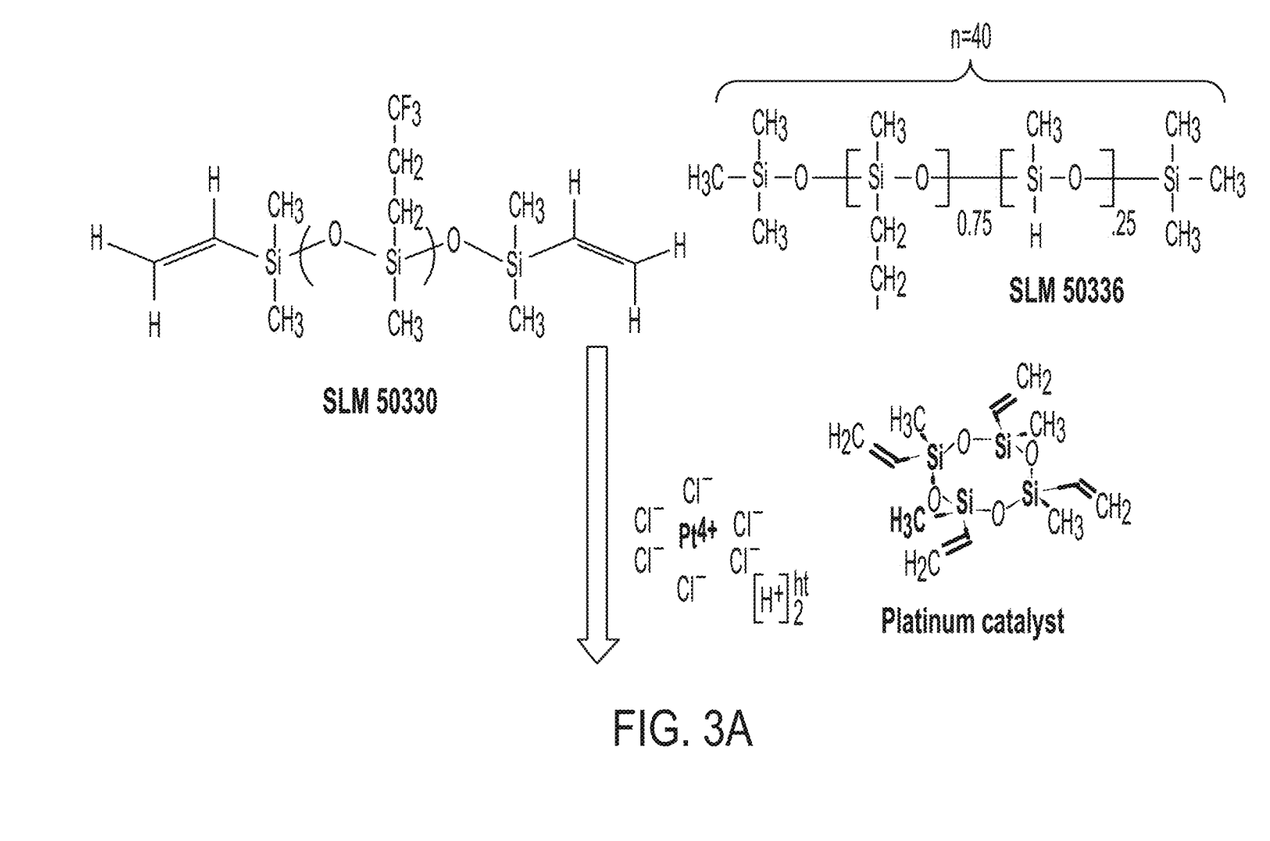
FIGS. 3A and 3B depict the hydrosilylation chemistry of a functional fluorosilicone topcoat used with various embodiments of the present carcasses disclosed herein.
Figure 3B:
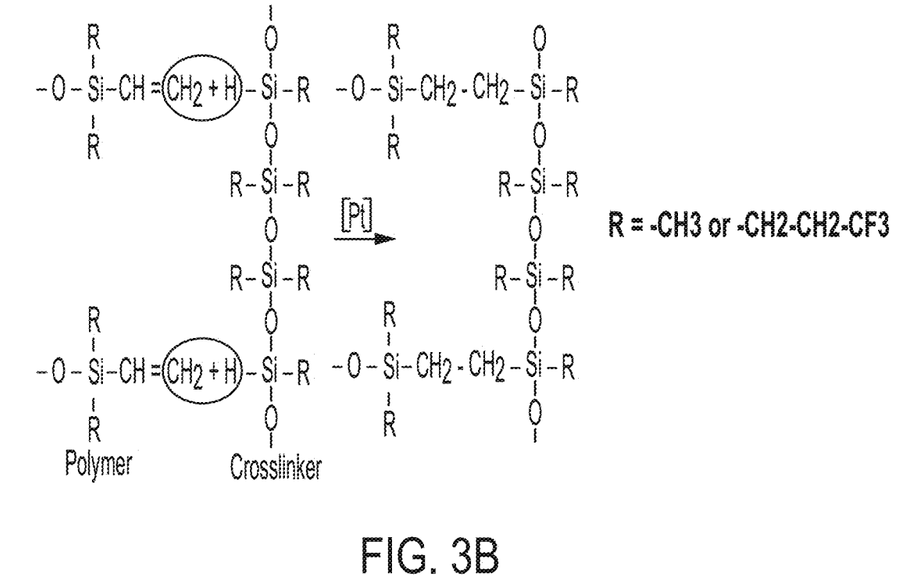
Figure 4:
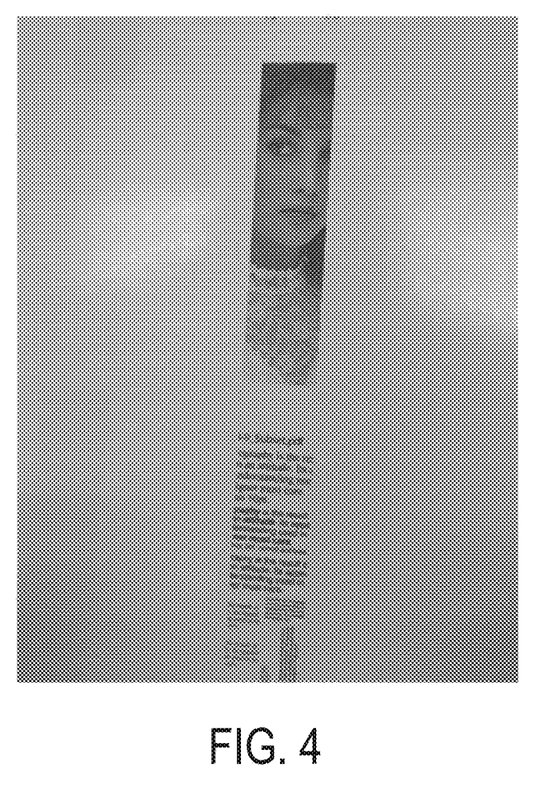
FIG. 4 depicts a print from an EPDM-based carcass showing excellent print IQ as described in the Examples.

FIGS. 3A and 3B depict hydrosilylation chemistry of a functional fluorosilicone topcoat 115 (FIG. 2) used with the multilayer base of the present carcass (FIG. 2). In this embodiment, Formulas 1 and 3 inter alia are combined with the platinum catalyst of Formula 2 and cured to form surface layer 115.

Aspects of the present disclosure may be further understood by referring to the following examples. The examples are illustrative, and are not intended to be limiting embodiments thereof. All parts are percentages by solid weight unless otherwise indicated.

EXAMPLES

Example 1. Surface Layer Formulation Components

A typical surface layer formulation is prepared using the following components shown in Tables 1 and 2, below.

TABLE 1

Surface Layer Formulation (Part A)*

| Component | Amount |
|---|---|
| Wacker Fluorosilicone SLM-50330 (n = 27) | 100 grams |
| Carbon Black (20%) | 30.4 grams |
| Aerosil R812S Silica | 1.7 grams |

TABLE 1-continued

Surface Layer Formulation (Part A)*

| Component | Amount |
|---|---|
| ZEPHRYM ™ PD 7000 dispersant (Croda Corporation) | 1.4 grams |
| Butyl Acetate | 288 grams |

*180 grams of steel beads are also used as milling media to break down the carbon black and disperse it in the polymer; the steel beads are filtered out before mixing Part A and B and before coating as described below. Accordingly, the steel beads are not included in the topcoat weight

TABLE 2

Surface Layer Formulation (Part B)

| Component | Amount |
|---|---|
| Platinum catalyst (14.3% in Butyl Acetate) | 5 grams |
| Wacker crosslinker SLM- 50336 | 34.27-22.5 grams (75% to 50% of original amounts) |
| Butyl Acetate | 34.27 to 22.5 grams |
| Platinum 88 Inhibitor | 0.8 grams |

Example 2. Two Part Preparation of Surface Layer Coating

Part A is prepared by first placing the silica and carbon black in a vacuum oven at 100° C. for 2 hours and then using a roll milling process to homogenously mix vinyl terminated fluorosilicone (Wacker Fluorosilicone SLM-50330), carbon black, silica and butyl acetate. A dispersant is then added to improve the stability and dispersion quality of the carbon black in the fluorosilicone polymer.

Part B is prepared by gentle mixing of fluorsilicone containing hydrosilane groups (Wacker cross-linker SLM 50336), butyl acetate and the catalyst inhibitor in a polypropylene bottle to form a crosslinker solution. A platinum catalyst solution (14.3 w/w %) is prepared by diluting proper amounts of the catalyst in butyl acetate in a polypropylene bottle.

When the rolling process for part A is completed, a platinum catalyst solution (14.3% w/w) is added to Part A followed by 5 minutes of gentle shaking. Then the Part B cross-linker solution is added to the Part A solution containing the platinum catalyst, followed by 5 minutes of roll milling. The formulation is then filtered through a filter fabric, e.g., 20 microns, to remove the stainless steel beads, followed by degassing in a vacuum desiccator for 5 minutes. The viscosity of the formulation is between 100-170 cps.

Example 3. Coating on a Sulfur-Free Rubber Substrate

A surface layer coating was prepared and applied to a piece of test ethylene propylene diene monomer (EPDM) rubber using a 0.003 millimeter drawbar, after degassing. The coating was then air dried for up to 1 hour and heated 160° C. for 4 hours to finish curing.

The surface layer coating cured completely. The surface layer coating had good adhesion with the EPDM. The EPDM piece did not swell or deform on contact with the solvent based coating or after high temperature cure. This result indicated that EPDM is suitable for high cure temperatures and is solvent resistant.

Example 4. Coating on a Carcass Containing an EPDM Rubber Layer, a Reinforcing Fiber Layer and a Compressible Layer A surface layer coating was prepared and applied to a piece of test carcass with the configuration shown in FIG. 2, except that the bottom layer, which typically contains a metal or plastic sleeve was omitted. The coating was applied after degassing using a 0.003 millimeter drawbar. After air drying for one hour, the carcass was heated at 160° C. for 4 hours to finish curing.

The surface layer coating had surprisingly good adhesion with the EPDM and the EPDM piece did not swell or deform on contact with solvent based dispersion or after high temperature cure. The blanket was print tested on a Yogi test fixture. The Print IQ met all specifications including optical density of solid patch, low background, good half tones and good image

Example 5. Coating on a Carcass Containing An EPDM Rubber Layer, 5 and a Compressible Layer A surface layer coating was prepared and applied to a piece of test carcass with the configuration shown in FIG. 2, except that the bottom layer, which typically contains a metal or plastic sleeve and a reinforcing fiber layer was omitted. The coating was applied after degassing using a 0.003 millimeter drawbar. After air drying for one hour, the carcass was heated at 160° C. for 4 hours to finish curing.

The surface layer coating had surprisingly good adhesion with the EPDM and the EPDM piece did not swell or deform on contact with solvent based dispersion or after high temperature cure. The blanket was print tested on a Yogi test fixture. The Print IQ met all specifications including optical density of solid patch, low background, good half tones and good image sharpness.

We claim:

1. A multilayer imaging blanket for a variable data lithography printing system, comprising:
    a multilayer base having a lower contacting surface configured to wrap around or to be mounted on a cylinder core of the variable data lithography printing system; and a platinum catalyzed fluorosilicone surface layer opposite the lower contacting surface;
    wherein the multilayer base is a sulfur-free carcass comprising:
        a top layer comprising an ethylene propylene diene monomer (EPDM) rubber substrate,
        a bottom layer comprising the lower contacting surface; and
        a compressible layer disposed between the top layer and the bottom layer, the compressible layer being attached to a surface of the top layer opposite the platinum catalyzed fluorosilicone surface layer and a surface of the bottom layer opposite the lower contacting surface,
        wherein the platinum catalyzed fluorosilicone surface layer adheres to the surface of the EPDM rubber substrate of the top layer without corona treatment and without a primer layer between the platinum catalyzed fluorosilicone surface layer and the EPDM rubber substrate.

2. The multilayer imaging blanket of claim 1, wherein the top layer further comprises a reinforcing fabric layer, the reinforcing fabric layer attached to a surface of the compressible layer opposite the bottom layer.

3. The multilayer imaging blanket of claim 1, wherein the bottom layer comprising the lower contacting surface is a base sleeve arranged to cooperate directly with a surface of the cylinder core of the variable data lithography printing system.

4. The multilayer imaging blanket of claim 1, wherein the top layer comprising the EPDM rubber substrate has a thickness ranging from 100 to 500 micrometers.

5. The multilayer imaging blanket of claim 1, wherein the EPDM rubber substrate is a seamless EPDM rubber substrate.

6. The multilayer imaging blanket of claim 1, wherein the platinum catalyzed fluorosilicone surface layer comprises carbon black, a silica, a crosslinker and a solvent.

7. The multilayer imaging blanket of claim 1, wherein the multilayer base is stable at 160° C. for at least 4 hours.

8. A variable data lithography system, comprising:
a multilayer imaging blanket comprising:
   a multilayer base having a lower contacting surface configured to wrap around or to be mounted on a cylinder core of the variable data lithography printing system; and a platinum catalyzed fluorosilicone surface layer opposite the lower contacting surface;
   wherein the multilayer base is a sulfur-free carcass comprising:
      a top layer comprising an ethylene propylene diene monomer (EPDM) rubber substrate,
      a bottom layer comprising the lower contacting surface; and
      a compressible layer disposed between the top layer and the bottom layer, the compressible layer being attached to a surface of the top layer opposite the platinum catalyzed fluorosilicone surface layer and a surface of the bottom layer opposite the lower contacting surface,
      wherein the platinum catalyzed fluorosilicone surface layer adheres to the surface of the EPDM rubber substrate of the top layer without corona treatment and without a primer layer between the platinum catalyzed fluorosilicone surface layer and the EPDM rubber substrate;
a fountain solution subsystem configured for applying a layer of fountain solution to the multilayer imaging blanket;
a patterning subsystem configured for selectively removing portions of the fountain solution layer so as to produce a latent image in the fountain solution;
an inking subsystem configured for applying ink over the multilayer imaging blanket such that said ink selectively occupies regions of the multilayer imaging blanket where fountain solution was removed by the patterning subsystem to thereby produce an inked latent image; and
an image transfer subsystem configured for transferring the inked latent image to a substrate; and an image transfer subsystem configured for transferring the inked latent image to a substrate.

9. The multilayer imaging blanket of claim 8, wherein the top layer further comprises a reinforcing fabric layer, the reinforcing fabric layer attached to a surface of the compressible layer opposite the bottom layer.

10. The multilayer imaging blanket of claim 8, wherein the bottom layer comprising the lower contacting surface is a base sleeve arranged to cooperate directly with a surface of the cylinder core of the variable data lithography printing system.

11. The multilayer imaging blanket of claim 8, wherein the top layer comprising the EPDM rubber substrate has a thickness ranging from 100 to 500 micrometers.

12. The multilayer imaging blanket of claim 8, wherein the EPDM rubber substrate is a seamless EPDM rubber substrate.

13. The multilayer imaging blanket of claim 8, wherein the platinum catalyzed fluorosilicone surface layer comprises carbon black, a silica, a crosslinker and a solvent.

14. The multilayer imaging blanket of claim 8, wherein the multilayer base is stable at 160° C. for at least 4 hours.

15. A multilayer imaging blanket for a variable data lithography printing system, comprising:
a multilayer base having a lower contacting surface configured to wrap around or to be mounted on a cylinder core of the variable data lithography printing system; and a platinum catalyzed fluorosilicone surface layer opposite the lower contacting surface;
   wherein the multilayer base is a sulfur-free carcass comprising:
      a top layer comprising a sulfur-free rubber substrate;
      a bottom layer comprising the lower contacting surface; and
      a compressible layer attached to a surface of the top layer opposite the platinum catalyzed fluorosilicone surface layer and a surface of the bottom layer opposite the lower contacting surface,
   wherein the platinum catalyzed fluorosilicone surface layer adheres to the surface of the sulfur-free rubber substrate of the top layer without corona treatment and without a primer layer between the platinum catalyzed fluorosilicone surface layer and the sulfur-free rubber substrate.

16. The multilayer imaging blanket of claim 15, wherein the sulfur-free rubber substrate is an ethylene propylene diene monomer (EPDM) rubber substrate.

17. The multilayer imaging blanket of claim 15, wherein the top layer further comprises a reinforcing fabric layer, the reinforcing fabric layer attached to a surface of the compressible layer opposite the bottom layer.

18. The multilayer imaging blanket of claim 15, wherein the multilayer base is stable at 160° C. for at least 4 hours.

19. The multilayer imaging blanket of claim 15, wherein the bottom layer comprising the lower contacting surface is a base sleeve arranged to cooperate directly with a surface of the cylinder core of the variable data lithography printing system.

20. The multilayer imaging blanket of claim 19, wherein the base sleeve is a rigid metal or a plastic.

* * * * *